(12) United States Patent
Cevahir et al.

(10) Patent No.: US 11,087,746 B2
(45) Date of Patent: Aug. 10, 2021

(54) INFORMATION PROCESSING DEVICE, INFORMATION PROCESSING METHOD, AND PROGRAM

(71) Applicant: Rakuten, Inc., Tokyo (JP)

(72) Inventors: Ali Cevahir, Raffles Place (SG); Stanley Kok, Raffles Place (SG)

(73) Assignee: Rakuten, Inc., Tokyo (JP)

( * ) Notice: Subject to any disclaimer, the term of this patent is extended or adjusted under 35 U.S.C. 154(b) by 125 days.

(21) Appl. No.: 16/520,614

(22) Filed: Jul. 24, 2019

(65) Prior Publication Data

US 2020/0143796 A1 May 7, 2020

(30) Foreign Application Priority Data

Nov. 1, 2018 (SG) .......................... 10201809737U (51) Int. Cl.
| | | |
|---|---|---|
| G10L 15/02 | (2006.01) | |
| G10L 15/08 | (2006.01) | |
| G10L 15/14 | (2006.01) | |
| G10L 25/84 | (2013.01) | |
| G06N 3/04 | (2006.01) | |
| G06N 20/20 | (2019.01) | |
| G10L 25/78 | (2013.01) | |

(52) U.S. Cl.
CPC .......... *G10L 15/148* (2013.01); *G06N 3/0454* (2013.01); *G06N 20/20* (2019.01); *G10L 25/84* (2013.01); *G10L 2025/783* (2013.01)

(58) Field of Classification Search
CPC ............ G10L 15/02; G10L 15/08; G10L 5/00
See application file for complete search history.

(56) References Cited

U.S. PATENT DOCUMENTS

| | | | | |
|---|---|---|---|---|
| 5,893,058 | A * | 4/1999 | Kosaka | G10L 15/12 704/254 |
| 10,199,040 | B2 * | 2/2019 | Lahiri | G10L 15/02 |
| 2010/0106511 | A1 * | 4/2010 | Shirakawa | G10L 19/02 704/500 |
| 2012/0130711 | A1 * | 5/2012 | Yamabe | G10L 25/78 704/231 |
| 2019/0034542 | A1 * | 1/2019 | Ming | G10L 15/22 |
| 2019/0371320 | A1 * | 12/2019 | Netzer | G06K 9/46 |
| 2020/0143796 | A1 * | 5/2020 | Cevahir | G06N 20/10 |

OTHER PUBLICATIONS

Veisi, H. et al., "Hidden-Markov-model-based voice activity detector with high speech detection rate for speech enhancement", IET Signal Processing, 2012, pp. 54-63, vol. 6, issue 1.

* cited by examiner

*Primary Examiner* — Shreyans A Patel
(74) *Attorney, Agent, or Firm* — Sughrue Mion, PLLC (57) ABSTRACT

In order to improve accuracy for detecting presence or absence of a target object. A time-series segmentation unit 102 creates first time-series data by segmenting processing target data into each frame of "n" time zones. Each of first determination units 103 creates "m" second time-series data by determining each frame of the first time-series data using "m" models having different characteristics. A second determination unit 104 creates a second determination result as a presence probability of the target object for a set of second time-series data including n×m data.

4 Claims, 8 Drawing Sheets

INFORMATION PROCESSING DEVICE, INFORMATION PROCESSING METHOD, AND PROGRAM

This application is based on and claims the benefit of priority from Singapore Patent Application No. SG10201809737U, filed on 1 Nov. 2018, the content of which is incorporated herein by reference.

BACKGROUND OF THE INVENTION

Field of the Invention

The present invention relates to an information processing device, an information processing method, and a program.

Related Art

In the related art, a voice activity detection (VAD) technology has been studied as a technology for determining presence or absence of human speech (target object) in a sound using a machine learning technique (for example, see Non-Patent Document 1). The technique discussed in Non-Patent Document 1 executes the VAD on the basis of a single model such as a hidden markov model (HMM).

Non-Patent Document 1: Veisi, H. et al., "Hidden-Markov-model-based voice activity detector with high speech detection rate for speech enhancement", IET Signal Processing (2012), 6(1):54

SUMMARY OF THE INVENTION

In the related art, various machine learning models for detecting presence or absence of a target object have been proposed in addition to the HMM. While there are suitable machine learning models based on balance of parameters such as a volume or a wavelength, some machine learning models are unsuitable. However, a method of determining which of the machine learning models is employed for balance of any parameter in advance has not been known in the art.

In view of such circumstances, an object of the invention is to detect presence or absence of a target object with accuracy higher than that of the related art even without determining which machine learning model is employed in advance.

In order to achieve the aforementioned object, according to an aspect of the invention, there is provided an information processing device that obtains a presence probability of a target object for a predetermined time zone of processing target data, the information processing device including:

a first determination unit configured to segment data on a time basis as unit data and acquire one or more of the unit data on the basis of the predetermined time zone from the processing target data as first time-series data of the predetermined time zone for each of "m" first determination criteria having different characteristics (where "m" denotes an integer equal to or greater than "2"), and create one or more data representing determination results of the first determination criteria for the first time-series data of the predetermine time zone as second time-series data; and a second determination unit configured to create a presence probability of the target object for the predetermined time zone as a second determination result on the basis of the "m" second time-series data created by the first determination unit, in which the second determination unit creates the second determination result using second determination criteria created or updated as a result of training using each determination result of the "m" first determination criteria for training data.

According to other aspects of the invention, there are also provided an information processing method and a program corresponding to the information processing device of the aforementioned aspect of the invention.

According to the present invention, it is possible to improve accuracy for detecting presence or absence of a target object.

DETAILED DESCRIPTION OF THE INVENTION

Embodiments of the invention will now be described with reference to the accompanying drawings.

Figure 1:
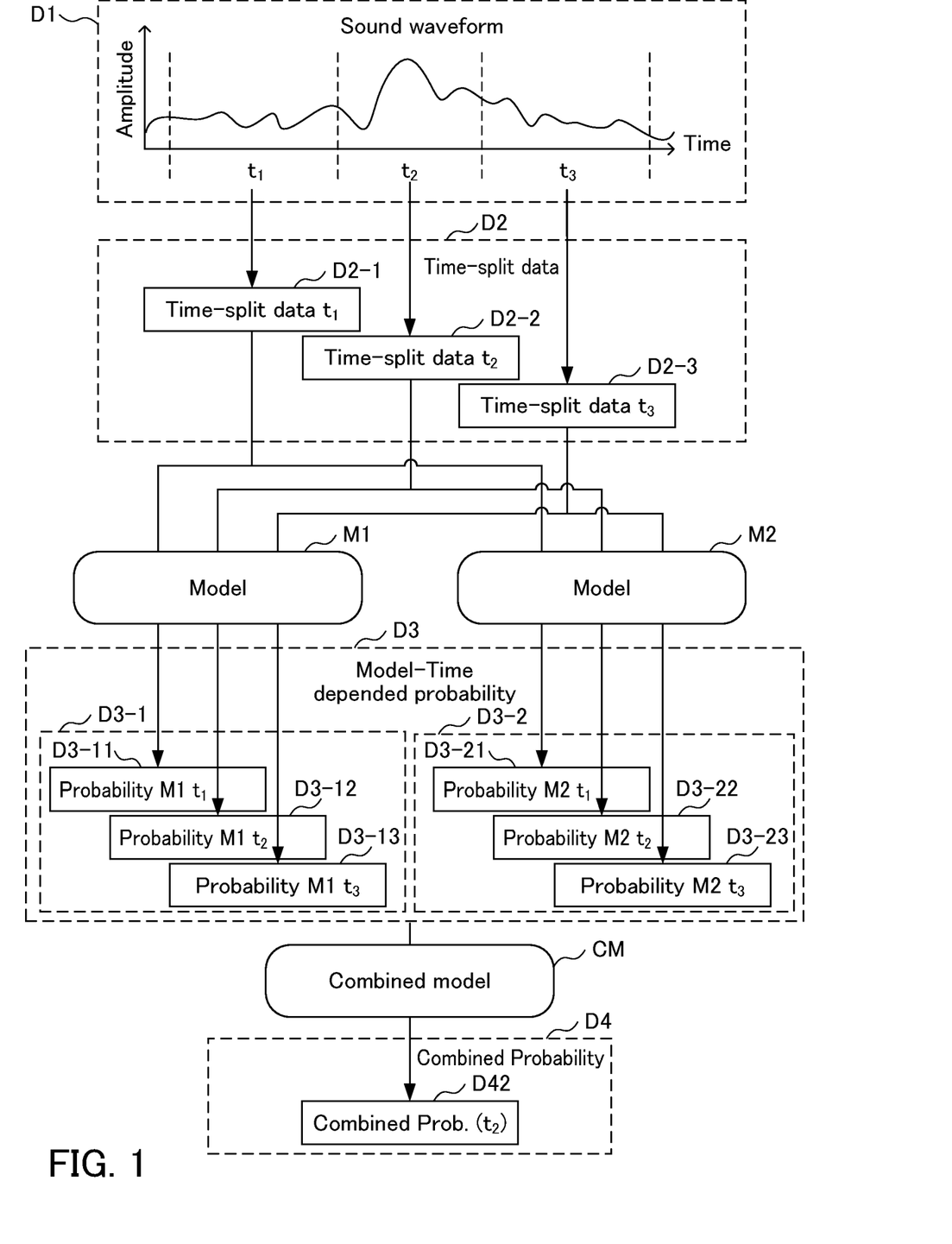
FIG. 1 is a diagram illustrating an exemplary flow of information processing executed by an information processing device according to an embodiment of the invention.

FIG. 1 is a diagram illustrating an exemplary flow of information processing executed by an information processing device according to an embodiment of the invention. For example, a voice determination device (for example, a voice determination device 1 of FIG. 3) of the information processing device according to an embodiment of the invention employs human speech as a target object for determining presence or absence as illustrated in FIG. 1. The voice determination device applies various types of processing as described below to audio data D1 to output a combined probability D4 as a presence probability of human speech in a predetermined time zone t2.

First, the voice determination device segments audio data D1 (sound waveform D1) in which human speech may be included in at least a part of the time zones into each interval (hereinafter, referred to as a "frame") of time zones t1 to t3.

Then, the voice determination device creates time-split data D2-1 to D2-3 for each frame of the time zones t1 to t3, respectively.

Then, the voice determination device executes a first determination process as described below.

Specifically, in the first determination process, the voice determination device determines the time-split data D2-1 of the time zone t1 using a first model M1 and outputs a probability D3-11 that depends on the first model M1 and the time zone t1 (Probability M1 t1 D3-11) as a determination result. Similarly, the voice determination device determines the time-split data D2-2 and D2-3 of the time zones t2 and t3, respectively, using the first model M1 and outputs each of probabilities D3-12 and D3-13 that depends on the first model M1 and the respective time as each determination result.

Similarly, in the first determination process, the voice determination device determines time-split data D2-1 to D2-3 for the time zones t1 to t3, respectively, using a second model M2 (Model M2) and outputs probabilities D3-12 to D3-23 that depend on the second model and the respective time as a determination result.

Here, VAD determinators having different characteristics are employed as the first and second models M1 and M2. Specifically, for example, the first model M1 includes a hidden markov model (HMM), and the second model M2 includes a support vector machine (SVM) model. Note that, although details will be described below in conjunction with FIG. 2 and the like, the number of models and the type of the model employed in the first determination may be set arbitrarily without limiting to those of FIG. 1.

Next, the voice determination device executes a second determination process as described below. That is, in the second determination process, the voice determination device combines and determines a set of probabilities D3-11 to D3-13 that depend on the respective model and the respective time (time-series data representing each determination result of the first model M1) and probabilities D3-21 to D3-23 that depend on the respective model and the respective time (time-series data representing each determination result of the second model M2) using a combined model (CM), and outputs a combined probability D42 in the time zone t2 (Combined Probability (t2) D42) as a determination result. Whether or not there is human speech in this time zone t2 is determined on the basis of the combined probability D42 of the time zone t2.

For example, in a case where it is necessary to determine whether or not there is human speech in the time zone t3, a time zone t4 is further defined although not illustrated in the drawings. In addition, the voice determination device obtains a combined probability for the time zone t3 by executing a series of the information processing described above for each of the time zones t2 to t4 and outputs the combined probability.

In the following description, one or more frames (three frames of time zones t1 to t3 in the example of FIG. 1) of the audio data D1 are set as time-series data as illustrated in FIG. 1, and the time-series data including each time-split data of each frame will be referred to as "time-series data D2". A set of frames of probabilities that depend on the respective time and the respective model as a result of the first determination process for the time-series data D2 will be referred to as "model/time-dependent probability time-series data D3 (Model/Time-dependent Probability D3)". Here, the data based on the first model out of the probability time-series data D3 that depend on the model and the time will be referred to as "model/time-dependent probability time-series data D3-1". Similarly, the data based on the second model out of the probability time-series data D3 that depend on the model and the time will be referred to as "model/time-dependent probability time-series data D3-2".

Specifically, assuming that the audio data D1 is segmented into time zones t1 to t3, the time-series data D2 includes the time-split data D2-1 to D2-3 of the time zone t1 to t3, respectively. The model/time-dependent probability time-series data D3 includes probability time-series data D3-1 that depends on the time and the first model and probability time-series data D3-2 that depends on the time and the second model. Here, the probability time-series data D3-1 that depends on the time and the first model includes probabilities D3-11 to D3-13 that depend on the respective time and the first model. Similarly, the probability time-series data D3-2 that depends on the time and the second model includes probabilities D3-21 to D3-23 that depend on the respective time and the second model.

Figure 2:
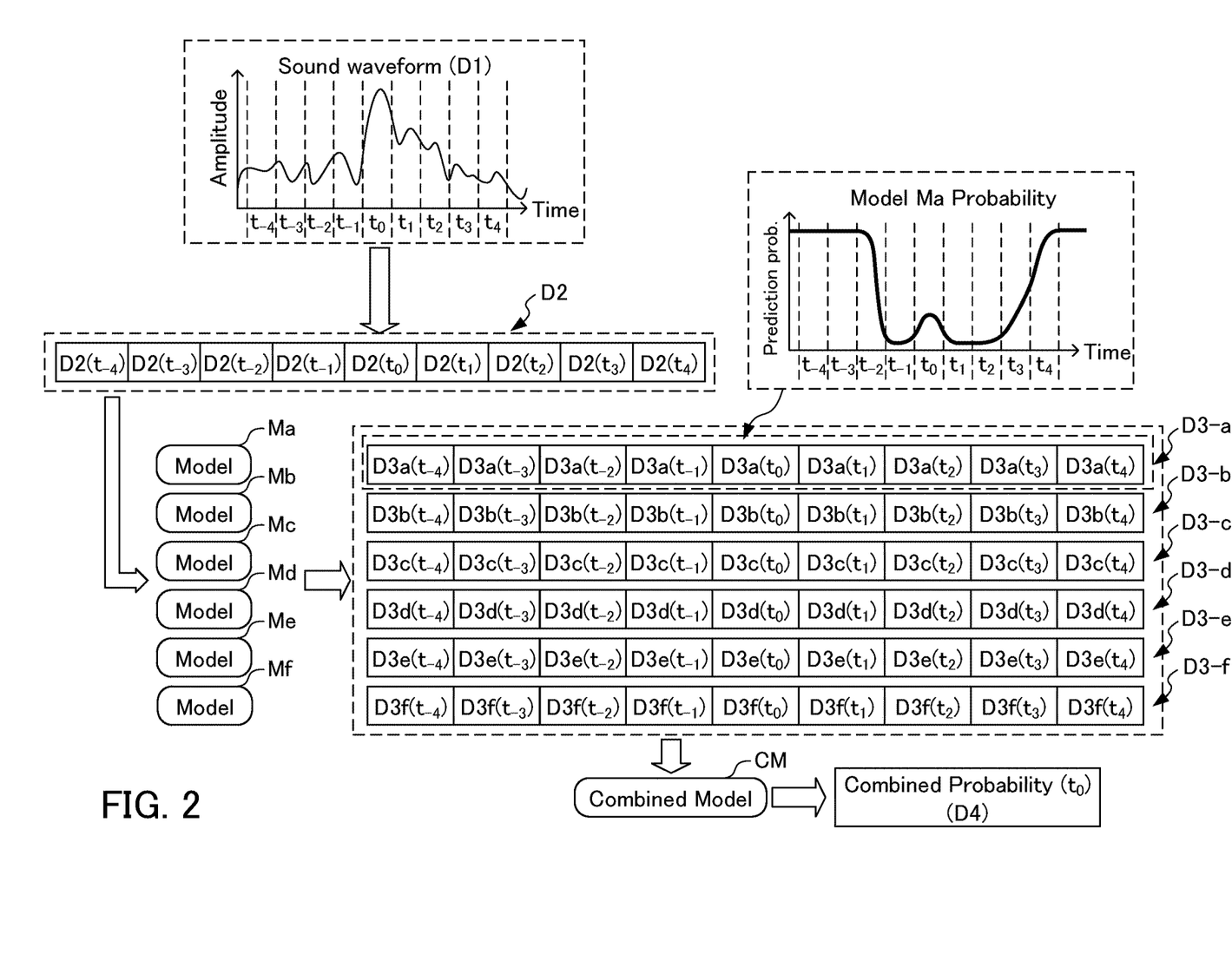
FIG. 2 is a diagram illustrating another exemplary flow of information processing executed by the information processing device according to an embodiment of the invention, which is different from the example of FIG. 1.

FIG. 2 is an exemplary flow of the information processing executed by the information processing device according to an embodiment of the invention, which is different from that of FIG. 1. That is, the example of FIG. 2 is an exemplary flow of the information processing in a case where more time-series data and more models are used in the information processing example of FIG. 1 in details.

The example of FIG. 2 is different from the example of FIG. 1 as described below. Specifically, in the example of FIG. 1, the voice determination device segments the audio data D1 in which human speech is included in at least a part of the time zone into time zones t1 to t3 to create three time-split data D2-1 to D2-3. In comparison, in the example of FIG. 2, the voice determination device creates nine time-split data D2(t-4) to D2(t4) by segmenting the audio data D1 into time zones t-4 to t4. In the example of FIG. 1, the voice determination device uses two models including the first and second models in the first determination process. In comparison, in the example of FIG. 2, the voice determination device uses six models including the models Ma to Mf.

In addition to this difference, in the example of FIG. 2, the following processes are executed unlike the example of FIG. 1.

Specifically, in the example of FIG. 2, the voice determination device segments the audio data D1 into nine time-split data D2(t-4) to D2(t4) for the time zones t-4 to t4, respectively, to create time-series data D2 as a set of the nine time-split data. The time lengths (frame lengths) of each time zone t-4 to t4 are set to 0.1 second in the example of FIG. 2.

Then, the voice determination device executes the first determination process. Specifically, the voice determination device inputs each of the time-split data D2 into each of the models Ma to Mf.

As a result, the probability time-series data D3-a that depend on the model Ma and the respective time are created as a set of probabilities D3a(t-4) to D3a(t4) that depend on the model Ma and the respective time. Similar to the audio data D1, the probability time-series data D3-a that depends on the model Ma and the respective time can be expressed as a graph in which time is segmented into the time zones t-4 to t4. For example, as illustrated in the graph "Model Ma Probability" in FIG. 2, the probability time-series data D3-a that depends on the model Ma and the respective time can be expressed as a graph plotted on a plane in which an abscissa refers to "time", and an ordinate refers to "predicted probability". In the example of the graph illustrated in FIG. 2, the determination result based on the model Ma shows that it is highly likely that human speech is included in the time zones t-4 to t-2 of the audio data D1, no human speech is included in the time zones t-1 to t3 of the audio data D1, and human speech is included in the time zone t4. In this manner, the voice determination device determines the time-split data D2(t-4) to D2(t4) for the time zones t-4 to t4, respectively, using the model Ma, and outputs probability time-series data D3-*a* that depends on the respective model and the respective time as the respective determination result.

Similarly, the voice determination device individually determines each time-split data D2(t-4) to D2(t4) for each time zones t-4 to t4 using each model Mb to Mf, and outputs probability time-series data D3-*b* to D3-*f* that depends on the respective model and the respective time as the respective determination results.

Although not illustrated in the drawings, similar to the case of the model Ma described above, each of the time-series data D3-*b* to D3-*f* of probabilities that depend on the respective model Mb to Mf and the respective time can be expressed as a graph illustrating a time structure of the probabilities of each model Mb to Mf.

Here, similar to FIG. 1, VAD determinators having different characteristics are employed in the models Ma to Mf. Each of the models Ma to Mf is a model used in machine learning, such as a HMM, a SVM, gradient boosting, a convolutional neural network (CNN), a CNN-biRNN (0.32 sec window), and a CNN-biRNN (0.96 sec window). Here, the CNN-biRNN is obtained by applying a bidirectional recurrent neural network (biRNN) as a model for improving accuracy using future information in the RNN to the CNN. The CNN-biRNN has a pair of parameters, that is, a window of 0.32 sec and a window of 0.96 sec. That is, the VAD determinator having different characteristics is to be construed in a broad sense, including a difference of the parameter such as a difference of the window without limiting to a case where each model of the machine learning is different. In addition, needless to say, the machine learning model described above is just for exemplary purposes. That is, any machine learning model other than those described above may also be employed. Furthermore, without limiting to the machine learning model, a determinator that performs determination on the basis of a predetermined algorithm may also be employed.

Through the first determination process, the voice determination device obtains each time-series data of nine probabilities as determination results of each of six models Ma to Mf. A total of fifty four (=6×9) probabilities are output as the model/time-dependent probability time-series data D3. Then, the voice determination device executes a second determination process. That is, the voice determination device determines the model/time-dependent probability time-series data D3 using the combined model CM and outputs a combined probability D4 for the time zone t0 (Combined Probability (t0) D4) as a determination result.

The combined model CM may include, for example, an ensemble neural network, a multi-modal ensemble model, gradient boosting, and the like. Note that the ensemble neural network or the gradient boosting is just for exemplary purposes, and any other machine learning technique may also be employed. Alternatively, the combined model CM may include a determinator that performs determination using a predetermined algorithm without limiting to the machine learning model.

Figure 3:
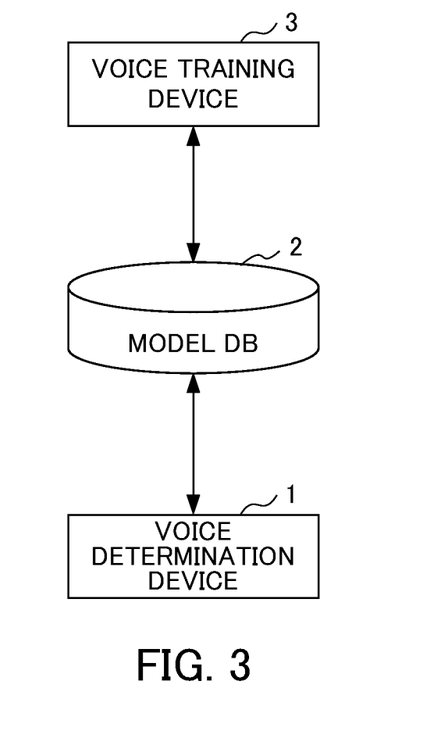
FIG. 3 is a diagram illustrating an exemplary configuration of an information processing system according to an embodiment of the invention.

An information processing system for performing information processing of FIGS. 1 an 2, that is, an information processing system according to an embodiment of the invention will now be described with reference to the accompanying drawings. FIG. 3 is a diagram illustrating an exemplary configuration of the information processing system according to an embodiment of the invention.

The information processing system of FIG. 3 includes a voice determination device 1, a model DB 2, and a voice training device 3.

The voice determination device 1 acquires a model obtained (or updated) as a result of training of the voice training device 3 from the model DB 2 and determines presence or absence of human speech for each interval (frame). A functional configuration or processing of the voice determination device 1 will be described later in details with reference to FIG. 5 and the like. The voice training device 3 performs machine learning for determination of the presence probability of human speech in each interval (frame) to create or update the model (especially, the combined model CM of FIG. 1 or 2 described above) and store the model in the model DB 2. A functional configuration or processing of the voice training device 3 will be described below in details with reference to FIG. 7 and the like.

Figure 4:
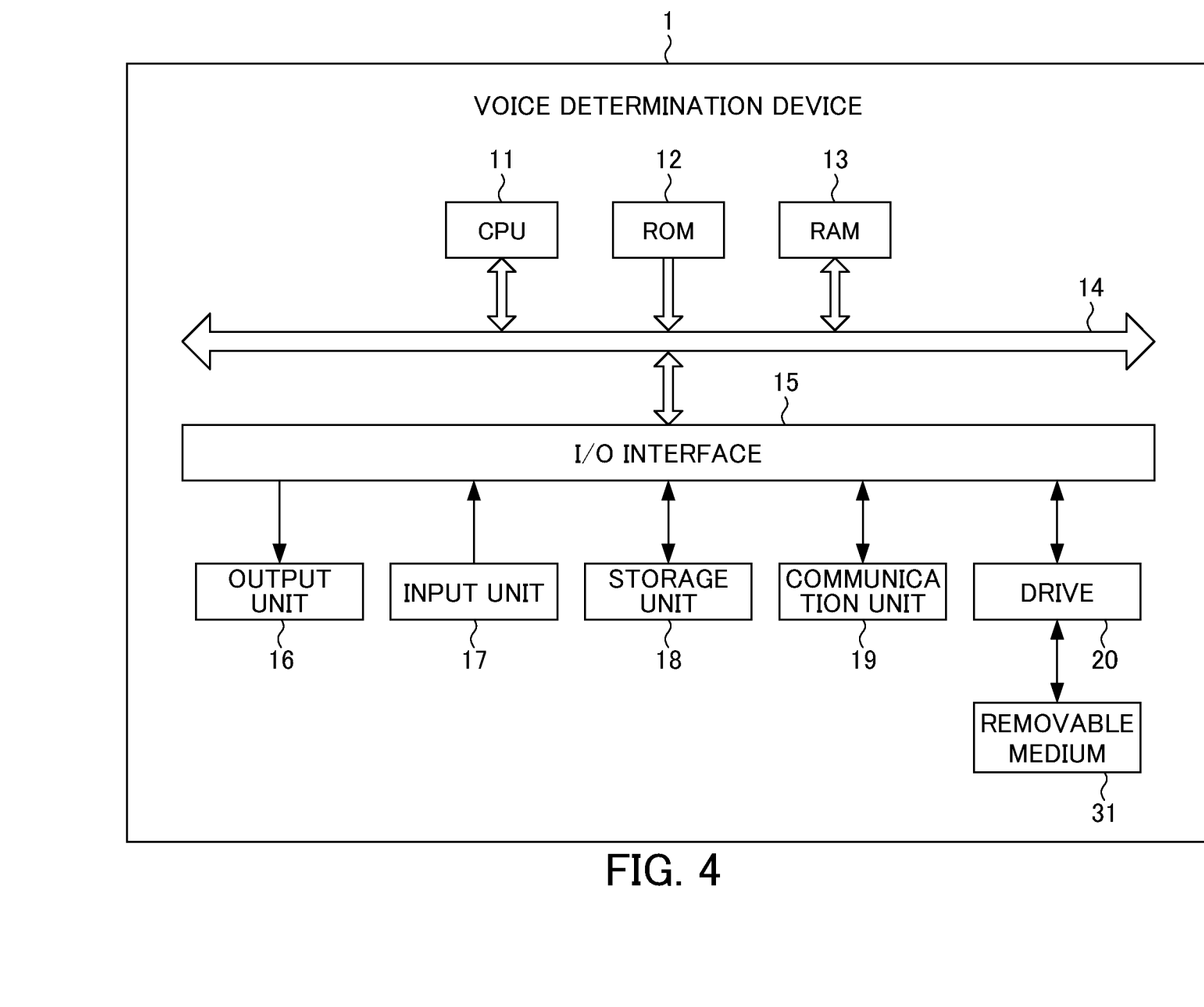
FIG. 4 is a block diagram illustrating an exemplary hardware configuration of a voice determination device of the information processing device according to an embodiment of the invention in the information processing system of FIG. 3.

FIG. 4 is a block diagram illustrating an exemplary hardware configuration of the voice determination device of the information processing device according to an embodiment of the invention in the information processing system of FIG. 3.

The voice determination device 1 includes a central processing unit (CPU) 11, a read-only memory (ROM) 12, a random access memory (RAM) 13, a bus 14, an I/O interface 15, an output unit 16, an input unit 17, a storage unit 18, a communication unit 19, and a drive 20. The CPU 11 executes various processes on the basis of a program recorded in the ROM 12 or a program loaded on the RAM 13 from the storage unit 18. The RAM 13 also suitably stores data necessary to allow the CPU 11 to execute various processes.

The CPU 11, the ROM 12, and the RAM 13 are connected to each other via the bus 14. In addition, the I/O interface 15 is also connected to the bus 14. The output unit 16, the input unit 17, the storage unit 18, the communication unit 19, and the drive 20 are connected to the I/O interface 15. The output unit 16 includes a display, a loudspeaker, and the like to output an image or sound. The input unit 17 includes a keyboard, a mouse, and the like to input various types of information in response to a user's command. The storage unit 18 includes a hard disk and the like to store various types of data of information.

The communication unit 19 controls communication with other terminals (such as the model DB 2 of FIG. 1) via a network. A removable medium 31 such as a magnetic disc, an optical disc, an optical-magnetic disc, or a semiconductor memory is suitably installed in the drive 20. The program read from the removable medium 31 by the drive 20 is installed in the storage unit 18 as necessary. In addition, similar to the storage unit 18, the removable medium 31 may also store various types of data stored in the storage unit 18.

Although not illustrated in the drawings, the voice training device 3 of the information processing system of FIG. 3 basically has the same hardware configuration as that of FIG. 4. Although it is assumed that the voice training device 3 is provided separately from the voice determination device 1 for convenient description purposes, each function of the voice training device 3 and the voice determination device 1 may be integrated into a single information processing device without limiting thereto.

Figure 5:
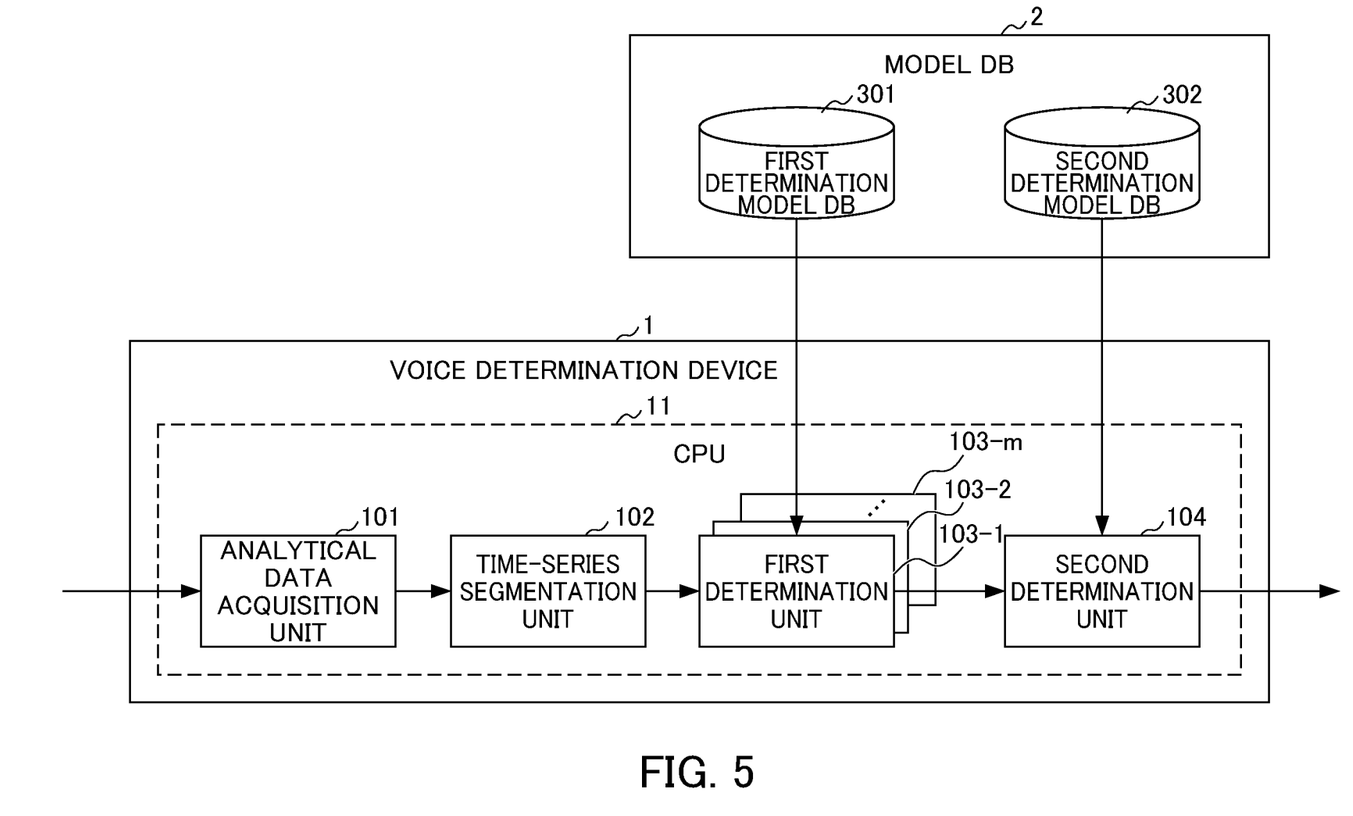
FIG. 5 is a block diagram illustrating an exemplary functional configuration of the voice determination device of FIG. 4.

FIG. 5 is a functional block diagram illustrating an exemplary functional configuration of the voice determination device of FIG. 4.

First, a functional configuration of the voice determination device 1 will be described. The CPU 11 of the voice determination device 1 functions as an analytical data acquisition unit 101, a time-series segmentation unit 102, first determination units 103-1 to 103-$m$, and a second determination unit 104. Here, the subscript "m" denotes the number of models used in the first determination process, that is, the number of "VAD determinators (models) having different characteristics", and is set to "2" in the example of FIG. 1 and "6" in the example of FIG. 2.

A first determination model DB 301 and a second determination model DB 302 are provided in one area of the model DB 2. The first determination model DB 301 stores "m" VAD determinators (models) having different characteristics, and the "m" VAD determinators are used in the first determination units 103-1 to 103-$m$, respectively. The second determination model DB 302 stores the combined model CM used by the second determination unit 104.

The analytical data acquisition unit 101 acquires audio data (such as the audio data D1 of FIG. 1 or 2) of a sound waveform that may contain human speech as analytical data via the communication unit 19 (FIG. 4) and the like.

The time-series segmentation unit 102 segments the analytical data (audio data D1) provided from the analytical data acquisition unit 101 into "n" time-series data for "n" time zones (frames), respectively, and creates time-series data D2 by organizing the "n" time-series data. Here, "n" denotes the number of time-split data included in the time-series data D2, that is, the number of the time zones (frames). The "n" is set to "three" in the example of FIG. 1 or "nine" in the example of FIG. 2.

The first determination unit 103-K (where "K" denotes any integer number selected from 1 to "m") acquires the (k)th model out of "m" models from the first determination model DB 301. The first determination unit 103-K executes the first determination process for each of the "n" time-split data (data of frame) included in the time-split data D2 provided from the time-series segmentation unit 102 using the (k)th model.

The second determination unit 104 acquires "time-series data D3 of "m" probabilities" obtained as a result of executing the first determination process in each of the "m" first determination units 103-1 to 103-$m$. Specifically, since the single "probability time-series data D3" is a set of probabilities for the "n" time zones (frames), a set of probabilities (a total of n×m probabilities) are supplied to the second determination unit 104. In this regard, the second determination unit 104 executes a second determination process for a set of probabilities (a total of n×m probabilities). Specifically, the second determination unit 104 acquires the combined model CM obtained (or updated) by the machine learning from the second determination model DB 302. The second determination unit 104 executes a determination process using the combined model CM and outputs the combined probability D4 for a predetermined (representative) time zone out of the "n" time zones (for example, the time zone t2 in the example of FIG. 1 and the time zone t0 in the example of FIG. 2) as a result of the determination.

The voice determination device 1 can outputs the combined probability D4 obtained in this manner to the output unit 16 (such as a display) or store the combined probability D4 in the storage unit 18.

The second determination unit 104 acquires the probability time-series data D3 and outputs the combined probability D4. As a result, the voice determination device 1 having the second determination unit 104 has the following advantageous effects.

For example, the data acquired by the second determination unit 104 is the time-series data. As a result, in the first determination process, in a case where a model (for example, the model Ma) that determines which time zone t0 the sound is included is not based on the time-split data D2(t1) of immediately preceding or following time (for example, the time zone t1), that is, even when the determination is performed on the basis of only a certain time zone t0, it is possible to perform the determination on the basis of the model/time-dependent probability D3$a$(t1) as a result of the determination for the immediately preceding or following time in the second determination process.

For example, the data acquired by the second determination unit 104 is a result of determination for each model having different characteristics. Therefore, assuming that one of the models used in the first determination process (for example, model Mb) has high determination accuracy under a lot of noise, and the other model used in the first determination process (for example, model Mc) has high accuracy under little noise, the second determination unit 104 can output the combined probability D4 regardless of the amount of noise. In other words, in a case where only one model is used, a characteristic of this model is directly reflected on a final probability. This is disadvantageous. In order to address such a disadvantage, the second determination unit 104 is employed.

In addition, for example, assuming that one of the models used in the first determination process (for example, d-model Md) has high detection accuracy in a speech start, and the other model used in the first determination process (for example, e-model Me) has high detection accuracy during speech, the second determination unit can output the combined probability D4 having high detection accuracy in a speech start based on the result of the d-model Md and having high detection accuracy during speech based on the result of the e-model Me.

That is, the second determination unit 104 acquires the probability time-series data D3 as a set of determination results of each of the "m" models (corresponding to determination results of time-series data of "n" time zones (frames)) and performs determination by combining them. As a result, the voice determination device 1 can further improve accuracy for detecting presence or absence of a target object (human speech).

However, the voice determination device 1 can output a plurality of combined probabilities D4 by executing a series of the aforementioned processes while delaying each of the "n" time zones (frames). That is, the voice determination device 1 can output the time-series data of the combined probability D4.

The combined probability D4 as a determination result may be used as a so-called VAD determination result. That is, the combined probability D4 may be used in suitable detection of a conversation (exchange of "human speech" between two or more people). Specifically, the combined probability D4 may be used in the following way. For example, in the case of creation of subtitles in a movie or the like, an operator who creates subtitles does not directly use the audio data D1, but may use the time-series data of the combined probability D4 in order to effectively extract start and end points of a conversation using the VAD determination. As a result, the operator may reduce a burden of the work for extracting human speech or the like. For example, it is possible to complete the work within a short time. In other words, typically, the operator creates subtitles simply by watching a video containing sound (in the example described above, the sound corresponding to the audio data D1). In comparison, the operator can effectively extract the start and end points of the conversation by suitably using the time-series data of the combined probability D4. As a result, it is possible to reduce the burden.

Meanwhile, in the related art, when likelihood of a conversation is determined from the audio data D1, for example, whether or not an amplitude of the sound waveform corresponding to the audio data D1 exceeds a threshold value is employed as a determination criterion. That is, in the related art, the operator (the information processing device which receives a manipulation for the determination) determines that there is a conversation in a case where the amplitude is larger than a predetermined threshold value. However, this determination criterion is effective when there is speech in a quiet conference room. When there is a sound source other than the conversation such as a background music or noise, this may not be so much effective in some cases.

In this regard, it is useful to use the combination probability D4 as a viewpoint of the likelihood of the conversation. Specifically, for example, the operator (the information processing device that receives the manipulation) may overlap a sound waveform obtained by weighting the combined probability D4 with the waveform of the audio data D1 and perform the work while comparing the waveforms. Specifically, for example, the operator may perform a suitable weighting process by decreasing a sound level of the time zone having a low probability of the combined probability D4 (that is, the time zone determined as having a low probability of the conversation) or increasing a sound level of the time zone having a high probability of the combined probability D4 (that is, the time zone determined as having a high probability of the conversation). As a result, whether or not there is a conversation in each time zone can be notified to the operator with high accuracy. Therefore, the operator can perform the work effectively with a little burden, compared to the related art.

It is possible to more suitably predict whether or not human speech is included in the determination target time zone by using the combined probability D4. Note that accuracy of determining whether or not a conversation stops or whether or not a speaker takes a breath during a conversation may not be sufficient in some cases. In this case, the combined probability D4 may be used, for example, in the following way. Specifically, for example, the operator may use a waveform obtained by weighting the combined probability D4 to the waveform of the audio data D1. As a result, the operator may perform determination by using information (combined probability D4) regarding whether or not human speech is included in each time zone. If it is determined that no human speech is included, the operator may perform determination by listening the sound of that time. In addition, the operator may perform determination regarding whether or not human speech is included, whether or not the conversation is terminated, whether or not a speaker takes a breath during the conversation, and the like.

By using the combined probability D4 in various manners in this way, for example, the operator may more effectively create subtitles.

Figure 6:
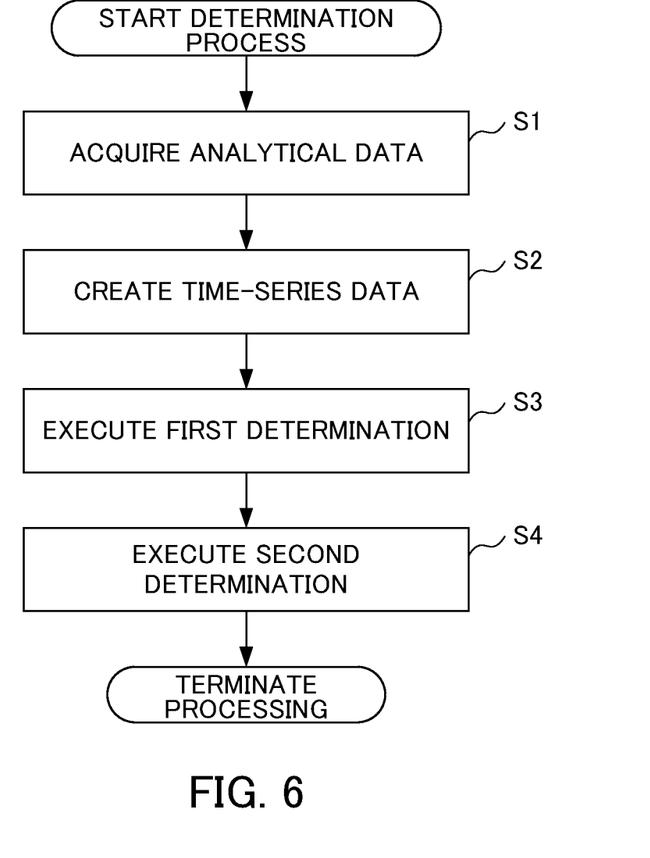
FIG. 6 is a flowchart illustrating an exemplary flow of the determination process executed by the voice determination device having the functional configuration of FIG. 4.

Next, a determination process executed by the voice determination device 1 of FIG. 4 will be described with reference to FIG. 6. The determination process is a process of determining presence or absence of human speech by obtaining a presence probability of human speech for each frame in a case where sound is segmented into a plurality of frames. FIG. 6 is a flowchart illustrating an exemplary flow of the determination process executed by the voice determination device having the functional configuration of FIG. 4.

In step S1, the analytical data acquisition unit 101 acquires the audio data D1 that may contain human speech as analytical data.

In step S2, the time-series segmentation unit 102 creates a set of time-split data of each of "n" time zones (frames), that is, the time-series data D2 from the analytical data (audio data D1).

In step S3, the first determination unit 103 performs a first determination process for the time-series data D2. Specifically, each of the first determination units 103-1 to 103-$m$ acquires one of the "m" models used by itself from the first determination model DB 301 and applies the first determination process using the acquired model to each of the time-series data D2. As a result, the first determination units 103-1 to 103-$m$ create model/time-dependent probability time-series data D3-1 to D3-$m$, respectively. As a result, model/time-dependent probability time-series data D3 are created as a set of probabilities (a total of n×m probabilities).

In step S4, the second determination unit 104 performs a second determination process for the model/time-dependent probability time-series data D3. That is, the second determination unit 104 creates a combined probability D4 by applying the second determination process using the combined model CM to the model/time-dependent probability D3 (result of the first determination process).

Hereinbefore, a flow of the determination process for voice activity detection for determining whether or not human speech is included in each time of the target sound has been described.

Figure 7:
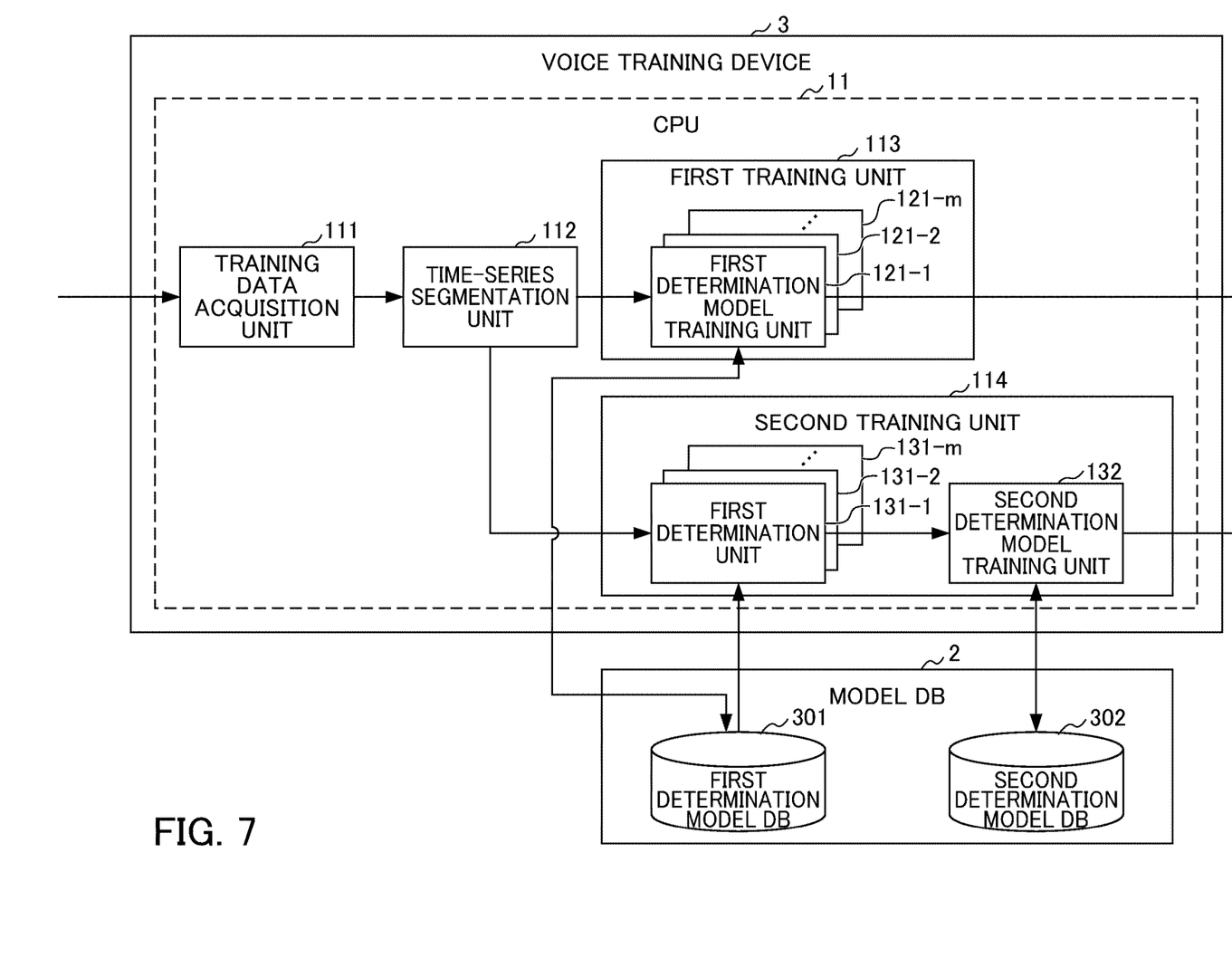
FIG. 7 is a functional block diagram illustrating an exemplary functional configuration of the voice training device of FIG. 3.

Next, a voice training device 3 that performs training for creating or updating the model used by the voice determination device 1 and a process thereof will be described. FIG. 7 is a functional block diagram illustrating an exemplary functional block of the voice training device of FIG. 3.

The CPU 11 of the voice training device 3 functions as a training data acquisition unit 111, a time-series segmentation unit 112, a first training unit 113, and a second training unit 114.

The training data acquisition unit 111 acquires audio data regarding a sound waveform containing human speech as training audio data via a communication unit 19 (FIG. 4) or the like. Note that the training data acquisition unit 111 may acquire information regarding whether or not speech is actually included in each time zone (frame) of the training audio data as a support of training and provide this information to the time-series segmentation unit 112.

The time-series segmentation unit 112 segments the training audio data provided from the training data acquisition unit 111 into "n" time-split data for each time zone (frame) and creates time-series data (data similar to the time-series data D2 created by the voice determination device 1) by organizing the "n" time-split data. In addition, the time-series segmentation unit 112 provides the created time-series data to the first and second training units 113 and 114. Here, the number "n" matches that of the voice determination device 1 of FIG. 5 and denotes the number of the time-split data contained in the time-series data, that is, the number of the time zones (frames). The number "n" is set to "three" in the example of FIG. 1 and "nine" in the example of FIG. 2. Here, in a case where information regarding whether or not a voice is actually included in each time zone of the training audio data is provided, the time-series segmentation unit 112 may add information regarding whether or not a voice is included to each time-split data of the time-series data and provide the information to the first and second training units 113 and 114.

In the first training unit 113, first determination model training units 121-1 to 121-m are operated. Here, the number "m" matches that of the voice determination device 1 of FIG. 5 and denotes the number of the models used in the first determination process, that is, the number of "VAD determinators (models) having different characteristics". The number "m" is set to "two" in the example of FIG. 1 and "six" in the example of FIG. 2. The first determination model training unit 121-K (where "K" denotes any integer number selected from 1 to "m") executes a training process for the first determination model for the (k)th model out of the "m" models using each of the "n" time-split data (data of frame) of the time-series data provided from the time-series segmentation unit 102. As a result of this training process, the (k)th model out of the models used by the voice determination device 1 in the first determination process is created or updated. The created or updated (k)th model is stored in the first determination model DB 301.

In the second training unit 114, the first and second determination units 131-1 to 131-m and 132 are operated. Here, the number "m" matches the number of the first training units 113 and that of the voice determination device 1 of FIG. 5 and denotes the number of the models used in the first determination process, that is, the number of "VAD determinators (models) having different characteristics". The number "m" is set to "two" in the example of FIG. 1 and "six" in the example of FIG. 2.

The first determination unit 131-K (where "K" denotes any integer number selected from 1 to "m") acquires the (k)th model out of "m" models from the first determination model DB 301. The first determination unit 131-K executes the first determination process for each of the "n" time-split data (data of frame) included in the time-split data provided from the time-series segmentation unit 112 using the (k)th model.

The second determination model training unit 132 acquires "m" "probability time-series data (corresponding to the probability time-series data D3 obtained by the voice determination device 1)" obtained as a result of executing the first determination process in each of the "m" first determination units 131-1 to 131-m. That is, since a single "probability time-series data" is a set of probabilities for the "n" time zones (frames), a set of probabilities (a total of n×m probabilities) are provided to the second determination model training unit 132. The second determination model training unit 132 executes the training process of the second determination model for the "m" "probability time-series data" as a set of probabilities (a total of n×m probabilities) provided from the first determination units 131-1 to 131-m. As a result of this training process, the combined model CM used by the voice determination device 1 in the second determination process is created or updated. The created or updated combined model CM is stored in the second determination model DB 302.

Figure 8:
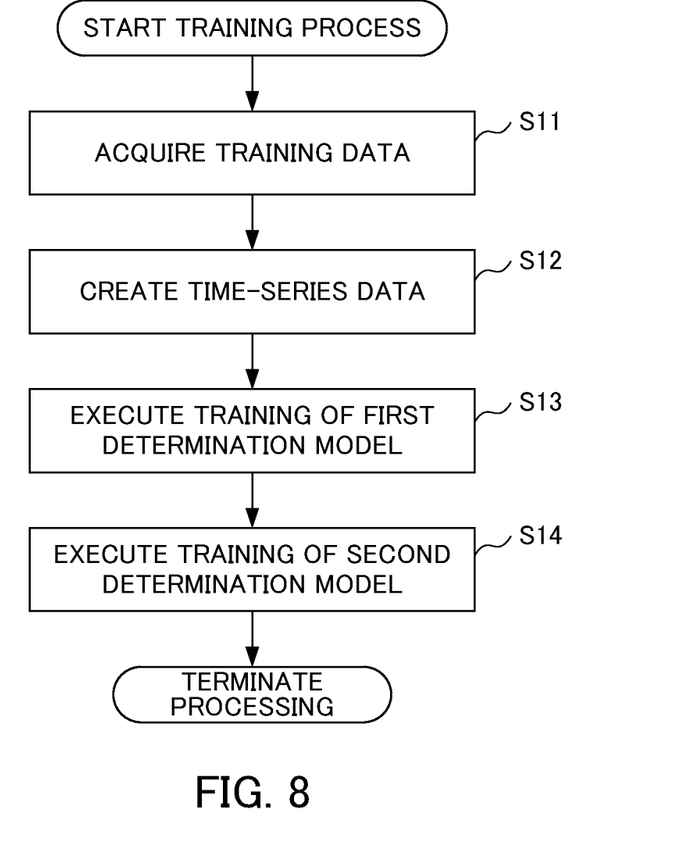
FIG. 8 is a flowchart illustrating an exemplary flow of a training process executed by the voice training device having the functional function of FIG. 7.

Next, a training process executed by the voice training device 3 of FIG. 7 will be described with reference to FIG. 8. The training process refers to a process of training the model used by the voice determination device 1. FIG. 8 is a flowchart illustrating an exemplary flow of the training process executed by the voice training device having the functional configuration of FIG. 7.

In step S11, the training data acquisition unit 111 acquires the audio data containing human speech as the training audio data.

In step S12, the time-series segmentation unit 112 creates time-series data as an element of each frame of the "n" time zones from the training audio data.

In step S13, the first training unit 113 performs training of the first determination model using the time-series data obtained in step S12. As a result of the training of the first determination model, each of the "m" models used by the voice determination device 1 in the first determination process is created or updated. Each of the created or updated "m" models is stored in the first determination model DB 301.

In step S14, the second training unit 114 performs training of the second determination model using the time-series data obtained in step S12. That is, the first determination unit 131-K acquires the (k)th model out of the "m" models from the first determination model DB 301. The first determination unit 131-K executes the first determination process for each of the "n" time-split data (data of frame) of the time-series data obtained in step S12 using the (k)th model. The second determination model training unit 132 acquires "m" "probability time-series data" obtained as a result of executing the first determination process for each of the "m" first determination units 131-1 to 131-m. That is, since a single "probability time-series data" is a set of probabilities for each of the "n" time zones (frames), a set of probabilities (a total of n×m probabilities) are provided to the second determination model training unit 132. The second determination model training unit 132 executes a training process of the second determination model for the "m" "probability time-series data" as a set of probabilities (a total of n×m probabilities) provided from the first determination units 131-1 to 131-m. As a result of this training process, the combined model CM used by the voice determination device 1 in the second determination process is created or updated. The created or updated combined model CM is stored in the second determination model DB 302.

While the embodiments of the invention have been described hereinbefore, they are not intended to limit the scope of the invention. Instead, alterations, modifications, or the like may be possible without departing from the spirit and scope of the invention.

For example, although the VAD determination for the audio data having a sound waveform that may contain human speech as a target object has been described by way of example in the aforementioned embodiment, the invention is not limited thereto. That is, for example, the target object may include other sounds such as a cry of an animal or a sound of a falling rain instead of the human speech. In addition, the processing target data is not limited to the audio data. That is, for example, the processing target data may include video or audio data contained in video data. Furthermore, although the data to be determined is sound in the aforementioned embodiment, the invention is not limited thereto. That is, for example, the determination target may include an image of video data. That is, for example, video data may be horizontally and vertically segmented into frames from the viewpoint of time, and a human being or a vehicle may be set as a target object to determine a probability of the target object present in the video. Furthermore, the determination may be performed by combining video and sound.

In addition, for example, although the sound processing or the training process is performed on a frame data (a predetermined time zone) basis as an element of the time-series data D2 in the aforementioned embodiment, the invention is not particularly limited thereto. That is, "data having a constant time length" may be employed as unit data.

Furthermore, although each of the time-split data of the time-series data D2 is individually determined using each of the models in the determination process or the training process in the aforementioned embodiment, the invention is not particularly limited thereto. That is, each of the time-split data of the time-series data D2 may be different for each of the models. That is, for example, the model may include a model in which the determination is performed on a single time-split data basis, a model in which the determination is performed on a plurality of time-split data basis, a model in which the determination is performed on the basis of time-split data having a length of the frame (predetermined time zone) different from those of other models. That is, the time-series data D2 may be prepared for each model.

For example, although the time-split data is data segmented into three for the time zone t2 as a determination target and the immediately preceding and following time zones t1 and t3 in the aforementioned embodiment, the invention is not limited thereto. That is, the data may be segmented for at least one of the time zones immediately preceding and following the time zone t2 as a determination target. For example, the time-series data D2 may include data of frames segmented into the two time zones t2 and t3. Furthermore, the time-series data D2 does not necessarily include data of frames for continuous time zones. Instead, the time-series data D2 may include only data of frames for discontinuous time zones (for example, time zones t1 and t3).

However, in the case of time zones that may include data of frames of both the immediately preceding and following time zones, that is, for example, in a case where frames of time zones included in the middle of the audio data are set as a determination target, the time-series data preferably includes data of frames of both the immediately preceding and following time zones. For example, in a case where a beginning or end point of the audio data is set as the determination target, it is difficult to include data of frames of both the immediately preceding and following time zones. Therefore, the time-series data may include data of frames for any one of the immediately preceding and following time zones. However, if the time-series data includes data of frames for both the immediately preceding and following time zones, it is highly likely that the combined model CM acquires information relating to a start point, an end point, and continuance of a conversation or the like. Therefore, the time-series data D2 preferably includes data of frames for both the time zones immediately preceding and following the determination target time zone.

For example, the time-series data D2 may not be obtained by simply segmenting the audio data D1 for each time zone. That is, data obtained by segmenting the audio data D1 for each time zone and then performing a predetermined processing may be used as the time-series data D2. For example, the time-split data may be transformed into a frequency component distribution for a predetermined time zone by applying the Fourier transform and may then be provided to the first determination unit 103. Furthermore, each time-split data may be obtained by extracting a characteristic amount from the data of each time zone. That is, the time-split data may be data for each of predetermined time zones.

Although the determinator used in the training includes a HMM, a SVM, gradient boosting, a convolutional neural network (CNN), a CNN-biRNN (0.32 sec window), and a CNN-biRNN (0.96 sec window) by way of example in the aforementioned embodiment (typically, FIG. 2), the invention is not particularly limited thereto. That is, the training described in the aforementioned embodiment may be executed using other machine learning methods, and the determinator may perform determination using other algorithms not classified as the machine learning. Furthermore, the first determinator may be a determinator that outputs a combination of results of several determinators, that is, a determinator corresponding to the second determination unit 104 of the aforementioned example.

For example, although the result of the first determination process, that is, the model/time-dependent probability D3 is a probability in the aforementioned embodiment, the invention is not limited thereto. That is, for example, a parameter such as an index of likelihood of the target object other than the probability may also be employed. In addition, a result obtained by performing determination of each model for each time zone may be employed.

For example, in the aforementioned embodiment, the first determination process is executed for each time-series data D2 of each frame including time zones immediately preceding and following the determination target time zone, and the second determination process is then executed. However, an execution sequence is not limited thereto. For example, all of the audio data D1 may be segmented for each time zone, and the first determination process may then be performed for each time zone. Then, all of the resulting data may be determined for each model and for each time zone as the model/time-dependent probability D3, and the second determination process may then be performed using a part of the results.

Although the multi-modal ensemble is employed as the determinator used in the second determination process by way of example in the aforementioned embodiment (typically, FIG. 2), the invention is not particularly limited thereto. That is, the training described in the aforementioned embodiment may be executed using other machine learning methods. In addition, the determinator may perform determination using other algorithms not classified as the machine learning. That is, for example, an average value of the model/time-dependent probability time-series data D3 as a set of probabilities (a total of n×m probabilities) may be simply obtained in the determination.

For example, in the aforementioned embodiment (for example, FIG. 2), the probability time-series data D3 includes nine probability time-series data obtained as result of the determination for six models Ma to Mf. Therefore, a set of fifty four (=6×9) probabilities obtained by organizing them are output as the model/time-dependent probability time-series data D3. However, the invention is not particularly limited thereto. That is, each of the six models may output each probability data corresponding to a single time using the determination based on the time-series data D2 including one or a plurality of time-split data. That is, for example, each of the six models may output each probability data corresponding to a single time, and the time-series data D3 may be combined using the combined model CM by organizing the six probability data as the time-series data D3. That is, the time-series data D3 may contain data of one or more probabilities for each model.

For example, in the aforementioned embodiment (for example, FIG. 1), the time-split data D2 having data of frames for the time zones immediately preceding or following the determination target time zone t2 as elements are created, and the combined probability D42 for the time zone t2 is created. However, the invention is not particularly limited thereto. That is, for example, all of the determination target audio data may be determined using the first and second models M1 and M2. Then, the model/time-dependent probability D3 may be created on the basis of each probability of the time zones t1 to t3 for each of the first and second models M1 and M2, and may be used in the second determination process.

As a result, for example, in a case where the determination is performed for the time zone t0 in FIG. 2, a result of the first determination process performed for the time zone t0 using the "a" model, that is, the model/time-dependent probability D3a(t0) is created in the middle of the process. However, since this data is also used in determination for the time zone t1, it is possible to reduce a computation load.

For example, a series of processes described above may be executed using either hardware or software. In other words, the functional configurations of FIGS. 5 and 7 are just for exemplary purposes and are not for limitative purposes. That is, the invention is sufficiently achieved by providing a function of executing a series of processes described above as a whole in the information processing system. Which function block is used to implement this function is not limited to the examples of FIGS. 5 and 7. In addition, the functional blocks may be provided in any place without particularly limiting to the configurations of FIGS. 5 and 7. For example, the functional block of the voice determination device 1 may be incorporated into the voice training device 3 or the like. In addition, the functional block of the voice training device 3 may be incorporated into the voice determination device 1 or the like. Furthermore, the voice determination device 1 and the voice training device 3 may be incorporated into the same hardware configuration.

For example, in a case where a series of the processes are executed using software, a program of the software is installed in a computer or the like via a network or from a recording medium. The computer may be integrated into a dedicated hardware configuration. The computer may be a computer capable of executing various functions by installing various programs, such as a server, a general purpose smartphone, or a personal computer.

For example, a recording medium storing such a program may include a removable medium (not illustrated) distributed separately from a device main body in order to provide the program to a user. The recording medium may be provided to a user while being integrated into the device main body in advance.

Note that, herein, steps for describing the program recorded in the recording medium may include processes performed in a time-series manner in their sequence and processes executed in parallel or individually instead of the time-series manner. In addition, herein, the terminology "system" refers to a whole device including a plurality of devices, unit, and the like.

In other words, the information processing device according to the invention may include various aspects having the following configurations. Specifically, the information processing device (for example, the voice determination device 1 of FIG. 3 or the like) according to the invention may be an information processing device that obtains a presence probability of a target object (for example, human speech) for a predetermined time zone of processing target data (for example, audio data D1 of FIG. 1), the information processing device including:

a first determination unit (for example, the first determination unit 103 of FIG. 5) configured to segment data on a time basis as unit data and acquire one or more of the unit data on the basis of the predetermined time zone from the processing target data as first time-series data (for example, the time-series data D2 of FIG. 1 and the like) of the predetermined time zone for each of "m" first determination criteria (for example, determination criteria based on each of the first and second models M1 and M2 of FIG. 1, or determination criteria based on each of the models Ma to Mf of FIG. 2) having different characteristics (where "m" denotes an integer equal to or greater than "2"), and create one or more data representing determination results of the first determination criteria for the first time-series data of the predetermine time zone as second time-series data (for example, time-series data D3-1 and D3-2 of "m" probabilities (where m=2) are created in the example of FIG. 1, and time-series data D3-a to D3-f of "m" probabilities (where m=6) are created in the example of FIG. 2); and a second determination unit (for example, the second determination unit 104 of FIG. 5) configured to create a presence probability (for example, the combined probability D4 in FIG. 1 or 2) of the target object for the predetermined time zone as a second determination result on the basis of the "m" second time-series data created by the first determination unit, in which the second determination unit creates the second determination result using second determination criteria created or updated as a result of training (result of training by the voice training device 1 of FIG. 7) using each determination result of the "m" first determination criteria for training data.

As a result, for example, in a case where the target object is human speech, the information processing device according to the invention can perform determination using the time-series data. Therefore, it is possible to reference information regarding a start point, an end point, and continuance of a conversation (exchange of human speech between two or more people) or the like or preceding or following determination results. Therefore, it is possible to further improve accuracy for detecting presence or absence of human speech (target object). In addition, it is possible to further improve accuracy for detecting presence or absence of human speech (target object) even without determining which machine learning model is employed out of the "m" first determination criteria having different characteristics.

The first determination unit may acquire one or more of the unit data including at least the unit data segmented on the basis of time different from the predetermined time zone as the first time-series data of the predetermined time zone from the processing target data.

As a result, for example, each determination result of the second time-series data becomes a determination result obtained using the first determination criteria based on data segmented on the basis of time different from the predetermined time zone. Therefore, it is possible to perform the second determination on the basis of a determination result for a time zone different from the predetermined time zone as well as a determination result based on balance of parameters such as a volume or a wavelength in a predetermined time zone. Accordingly, it is possible to further improve accuracy for detecting presence or absence of the target object.

In the aforementioned description, the information processing device obtains a presence probability of the target object by setting audio data as a processing target. However, as described above, the processing target data may be other types of data such as image data instead of the audio data. For example, in the case of image data, the target object is an object contained in the image, and presence or absence of the object may be detected in a space dimension (upward, downward, left, and right directions in a single still image) as well as a time dimension. That is, in the case of video data, it is possible to detect which of frames in a time dimension the target object is present and which position (such as a position in the space dimension such as a right edge of the image) in a single frame (a single still image) the target object is present at a predetermined timing. Therefore, the information processing device does not particularly necessarily obtain a presence probability of the target object within the processing target data. Instead, the information processing device may obtain a presence probability of the target object at target coordinates in an N-dimensional space (where "N" denotes an integer equal to or greater than "1") at least including the time dimension. Here, in the case of the space dimension, a two-dimensional space including horizontal and vertical directions is included in the N-dimensional space. That is, the information processing device according to the invention may have various embodiments having the following configuration.

Specifically, the information processing device according to the invention may be an information processing device that obtains a presence probability of a target object at target coordinates in an N-dimensional space (where "N" denotes an integer equal to or greater than "1") at least including a time dimension, the information processing device including:

a creation unit configured to create, as a first information group at predetermined coordinates, a set of "n" unit data (where "n" denotes an integer equal to or greater than "2") including unit data of the predetermined coordinates set as data at the predetermined coordinates in the N-dimensional space (for example, block data including a pixel or a plurality of pixels in each frame of the video data), and unit data at coordinates within a predetermined range from the predetermined coordinates in the N-dimensional space (for example, in the case of the space dimension, coordinates of upper, lower, left, and right pixels or blocks in a single frame at a predetermined timing);

a first determination unit configured to create a second information group as a set of "n" determination results based on predetermined determination criteria for each of the "n" unit data of the first information group at the predetermined coordinates using each of the "m" determination criteria having different characteristics (where "m" denotes an integer equal to or greater than "2"); and a second determination unit configured to create, as a second determination result, a presence probability of the target object at the predetermined coordinates in the N-dimensional space on the basis of the second information group created by the first determination unit using each of the "m" determination criteria.

EXPLANATION OF REFERENCE NUMERALS

1: VOICE DETERMINATION DEVICE, 2: MODEL DB, 3: VOICE TRAINING DEVICE, 11: CPU, 101: ANALYTICAL DATA ACQUISITION UNIT, 102: TIME-SERIES SEGMENTATION UNIT, 103: FIRST DETERMINATION UNIT, 104: SECOND DETERMINATION UNIT, 301: FIRST DETERMINATION MODEL DB, 302: SECOND DETERMINATION MODEL DB, 111: TRAINING DATA ACQUISITION UNIT, 112: TIME-SERIES SEGMENTATION UNIT, 113: FIRST TRAINING UNIT, 114: SECOND TRAINING UNIT, 121: FIRST DETERMINATION MODEL TRAINING UNIT, 131: FIRST DETERMINATION UNIT, 132: SECOND DETERMINATION MODEL TRAINING UNIT

What is claimed is:

1. An information processing device that obtains a presence probability of a target object for a predetermined time zone of processing target data, the information processing device comprising:
   at least one memory configured to store computer program code;
   at least one processor configured to access said computer program code and operate as instructed according to said computer program code, said computer program code including:
   first determination code configured to cause at least one of said at least one processor to segment data on a time basis as unit data and acquire one or more of the "n" unit data on the basis of the predetermined time zone from the processing target data as first time-series data of the predetermined time zone
   for each of "m" first determination criteria having different characteristics (where "m" denotes an integer equal to or greater than "2"), and
   create data representing determination results of the first determination criteria for each of "n" unit data included in the first time-series data of the predetermined time zone as second time-series data; and
   second determination code configured to cause at least one of said at least one processor to create a presence probability of the target object for the predetermined time zone as a second determination result on the basis of the "m×n" second time-series data created,
   wherein the second determination code is also configured to cause at least one of said at least one processor to create the second determination result using second determination criteria created or updated as a result of training using each determination result of the "m" first determination criteria for training data, and
   output a combined presence probability of the target object in the first time-series data of the predetermined time zone as a determination result, using a combined determination criteria based on each of the second determination result, for target object extraction from target data.

2. The information processing device according to claim 1, wherein
   the first determination code is configured to cause at least one of said at least one processor to acquire one or more of the "n" unit data including at least the unit data segmented on the basis of time different from the predetermined time zone as the first time-series data of the predetermined time zone from the processing target data.

3. An information processing method for obtaining a presence probability of a target object for a predetermined time zone of processing target data, the information processing method performed by at least one processor and comprising:
   segmenting data on a time basis as unit data and acquiring one or more of the "n" unit data on the basis of the predetermined time zone from the processing target data as first time-series data of the predetermined time zone
   for each of "m" first determination criteria having different characteristics (where "m" denotes an integer equal to or greater than "2"), and creating data representing determination results of the first determination criteria for each of "n" unit data included in the first time-series data of the predetermined time zone as second time-series data; and creating a presence probability of the target object for the predetermined time zone as a second determination result on the basis of the "m×n" second time-series data created, wherein the second determination result is created on the basis of second determination criteria created or updated as a result of training using each determination result of the "m" first determination criteria for training data, and outputting a combined presence probability of the target object in the first time-series data of the predetermined time zone as a determination result, using a combined determination criteria based on each of the second determination results, for target object extraction from target data.

4. A non-transitory computer readable medium storing a program that causes a computer configured to obtain a presence probability of a target object for a predetermined time zone of processing target data to execute a control process comprising:

segmenting data on a time basis as unit data and acquiring one or more of the "n" unit data on the basis of the predetermined time zone from the processing target data as first time-series data of the predetermined time zone for each of "m" first determination criteria having different characteristics (where "m" denotes an integer equal to or greater than "2"), and creating data representing determination results of the first determination criteria for each of "n" unit data included in the first time-series data of the predetermined time zone as second time-series data; and creating a presence probability of the target object for the predetermined time zone as a second determination result on the basis of the "m×n" second time-series data created, wherein the second determination result is created on the basis of second determination criteria created or updated as a result of training using each determination result of the "m" first determination criteria for training data, and outputting a combined presence probability of the target object in the first time-series data of the predetermined time zone as a determination result, using a combined determination criteria based on each of the second determination results, for target object extraction from target data.

* * * * *